(12) United States Patent
Flores

(10) Patent No.: US 6,962,388 B1
(45) Date of Patent: Nov. 8, 2005

(54) INFLATABLE AIR SPOILER

(76) Inventor: Christopher R. Flores, 3606 Allendale St., Victoria, TX (US) 77901

( * ) Notice: Subject to any disclaimer, the term of this patent is extended or adjusted under 35 U.S.C. 154(b) by 0 days.

(21) Appl. No.: 10/946,554

(22) Filed: Sep. 21, 2004

Related U.S. Application Data

(60) Provisional application No. 60/576,238, filed on Jun. 1, 2004.

(51) Int. Cl.$^7$ ................................... B60R 27/00
(52) U.S. Cl. .................. 296/180.1; 296/181.5
(58) Field of Search .................. 296/180.1, 180.2, 296/180.4, 181.5

(56) References Cited

U.S. PATENT DOCUMENTS

| | | | | |
|---|---|---|---|---|
| 2,737,411 A | * | 3/1956 | Potter ...................... | 296/180.4 |
| 3,814,472 A | * | 6/1974 | Zelikovitz ................ | 296/180.4 |
| 4,006,932 A | * | 2/1977 | McDonald ............... | 296/180.4 |
| 4,030,779 A | * | 6/1977 | Johnson ................... | 296/180.4 |
| 4,036,519 A | * | 7/1977 | Servais et al. ........... | 296/180.2 |
| 4,401,338 A | * | 8/1983 | Caldwell ................. | 296/180.2 |
| 4,451,075 A | | 5/1984 | Canfield | |
| 4,506,870 A | | 3/1985 | Penn | |
| 4,553,781 A | * | 11/1985 | Johnson ................... | 296/180.4 |
| 4,585,263 A | | 4/1986 | Hesner | |
| 4,601,508 A | * | 7/1986 | Kerian .................... | 296/180.4 |
| 4,688,841 A | * | 8/1987 | Moore ..................... | 296/180.4 |
| 4,702,509 A | * | 10/1987 | Elliott, Sr ................ | 296/180.4 |
| 4,707,015 A | * | 11/1987 | Klomfass ................. | 296/180.4 |
| 4,741,569 A | * | 5/1988 | Sutphen ................... | 296/180.4 |
| 4,978,162 A | * | 12/1990 | Labbe ..................... | 296/180.4 |
| 5,058,945 A | * | 10/1991 | Elliott et al. ............. | 296/180.1 |
| 5,090,765 A | * | 2/1992 | Gremillion ............... | 296/180.1 |
| 5,823,610 A | * | 10/1998 | Ryan et al. .............. | 296/180.4 |
| 6,409,252 B1 | * | 6/2002 | Andrus .................... | 296/180.1 |
| 6,457,766 B1 | * | 10/2002 | Telnack ................... | 296/180.1 |
| 6,467,833 B1 | * | 10/2002 | Travers ................... | 296/180.1 |
| 6,712,424 B2 | | 3/2004 | Swain | |
| 6,729,680 B2 | | 5/2004 | Lehmann | |
| 6,789,839 B1 | * | 9/2004 | Samuelson ............... | 296/180.4 |

* cited by examiner

*Primary Examiner*—Lori L. Coletta
(74) *Attorney, Agent, or Firm*—Royston Rayzor Vickery & Williams L.L.P.; William P. Glenn, Jr.

(57) ABSTRACT

An inflatable air spoiler for the use with a vehicle to reduce wind resistance. The inflatable air spoiler is made from abrasion resistant materials capable of forming a wedge shaped air spoiler. Securement of the inflatable air spoiler to a vehicle can be achieved with hooks, snaps and other fasteners. In another embodiment, securement of the inflatable spoiler in a vehicle's cargo bed is achieved by pressurizing the inflatable spoiler so its side panels or portions of its exterior surfaces are urged against the side walls of the cargo bed. Further securement is achieved by ballast chambers located on the bottom region of the inflatable air spoiler.

11 Claims, 1 Drawing Sheet

INFLATABLE AIR SPOILER

RELATED PATENT APPLICATIONS

This patent application claims priority to U.S. Provisional Application No. 60/576,238 filed Jun. 1, 2004 entitled "INFLATABLE AIR SPOILER"

DESCRIPTION

Technical Field

This invention relates to the reduction of air flow resistance on vehicles. More specifically, this invention relates to air spoilers or foils fixed to pickup trucks.

BACKGROUND OF THE INVENTION

Reducing air flow resistance for vehicles is a challenging task. In particular, reducing air flow resistance in pickup trucks is a challenge, particularly in the pickup truck bed region. Most operators of pickup trucks add a camper shell, cover the bed with a fiberglass hatch or simply lower the tailgate to reduce air flow resistance in the pickup truck bed region. Use of a camper shell or hatch is a costly improvement to the vehicle and requires significant modifications to adapt either one to fit a truck bed. While lowering the tail gate is simple, the operator loses the ability to secure loads within the pickup truck bed.

Another apparatus to alter air flow across a vehicle includes a spoiler that mounts to a vehicle's hitch receiver, as described in U.S. Pat. No. 6,712,424 issued to inventor Swain on Mar. 30, 2004. While this keeps the truck bed clear for loads, it requires a hitch receiver and does not affect the air flow within the truck bed region.

Another apparatus to alter air flow across a vehicle's bed is described in U.S. Pat. No. 6,729,680 issued to Lehmann on May 4, 2004. The Lehmann system and method for deflecting wind that impinges upon a tailgate includes the mounting of a retractable fabric sheet on the top of the tailgate at one end and to mounting points not less than one third of the length of the truck bed. The Lehmann retractable spoiler requires significant modifications, namely the mounting of attachment points in the truck bed and on the tailgate itself. Furthermore, stiffening of the fabric spoiler is achieved through tension. The effectiveness of the spoiler to redirect an air flow is a function of the fabric's tension.

U.S. Pat. No. 4,451,075 issued to Canfield on May 29, 1984 describes a removable storage cover for truck beds with a rigid sloping wall and a hinged top cover. U.S. Pat. No. 4,506,870 issued to Penn on Mar. 26, 1985 describes a similar combined storage compartment and spoiler. In each a sloping wall extending from the top of the tailgate toward the cab of the vehicle is configured to reduced wind resistance. Like the Lehman '680 patent, both Canfield '075 and Penn '870 require attachment points in/on the truck bed to mount the apparatus. While the rigid sloping wall of both Canfield's and Penn's invention overcome the tension problems associated with the Lehmann '680 patent, there is no means to breakdown and stow the container when not in use or the full length of the truck bed is required for carrying cargo.

U.S. Pat. No. 4,585,263 issued to Hesner on Apr. 29, 1986 describes an air deflector with rigid sloping wall similar to the patents issued to Canfield and Penn. However, the spoiler described in Hesner '263 does not require the fixing of attachment points in/on the vehicle's bed to mount the apparatus. Attachment is carried out by a series of clamps and stops removably fixed to the tailgate. Breaking down and storing of the spoiler described in Hesner '263 requires additional space/room for the clamping and stop mechanisms.

The invention disclosed in the following sections eliminates or reduces the limitations discussed above. The present invention provides a new and novel apparatus for deflecting air as it flows across a vehicles cargo bed through the use of an inflatable air spoiler that does not require mounting points to be fixed to/in the vehicle's cargo bed or tailgate. The invention further provides the advantage of being extremely portable, and easy to stow when not required. Finally, the inflatable air spoiler can be removed from the vehicle to function as a cushion or pillow.

SUMMARY OF THE INVENTION

The present invention introduces an inflatable air spoiler or foil onto a vehicle or in certain circumstances into the cargo bed of a vehicle, like a pickup truck. The inflatable air spoiler has a generally wedge shape, not unlike a slice of cake on its side. The inflatable air spoiler includes a bottom, at least two generally triangular shaped side walls, a generally rectangular shaped back wall and a sloping front wall. In one embodiment, the peripheries of the bottom, side walls, back wall and sloping front wall are joined in such a manner as to form at least one wedge shaped chamber capable of receiving a fluid (like air or water) through a re-sealable inflation port. In another embodiment, a chamber with an exterior surface is removably fixed to a vehicle. The chamber's exterior surface is further connected, at least in part, to a front panel. The front panel is supported in an inclined position by the chamber to direct air flow away from the vehicle. In this embodiment, the exterior shape of the chamber is not limited to a wedge shape.

The wedge shaped air spoiler fits in a vehicle's cargo bed with the bottom panel against the floor of the cargo bed; the side walls against the side panels of the cargo bed; and the back wall against the tailgate thereby orienting the front wall to slope down from the top region of the tailgate towards the front of the vehicle. The length of the bottom and the height of the back wall of the inflatable air spoiler determine the slope of the front wall. The length of the inflatable air spoiler's bottom can extend from the tailgate to distance just before, after or within a wheel well region of the vehicle. Indentations can be made to an inflatable air spoiler to accommodate cargo bed protrusions, such as wheel wells that extends into the vehicle's cargo bed.

Securement of the inflatable spoiler is achieved by the inflation pressure of the inflatable spoiler urging the side walls against the cargo bed side panels. An alternative securement uses ballast compartments located on the inflatable spoiler's bottom. These ballast compartments can be filled with sand, water or other weighty material to securely fix the inflatable spoiler in place. Another alternative would be the combination of both securement methods. Of course traditional releaseable securement points such as snaps, hooks, zippers, straps, hook and loop material can be use alone or in conjunction with the above described securements.

One object of the invention is to present an air spoiler for use in a vehicle's cargo bed to eliminate or at least reduce the amount of air flow drag across this region. Another object of the invention is to provide an air spoiler that is easy to install and remove from the cargo bed of a vehicle. A further object of this invention is to provide an air spoiler that can be used as a cushion either in or out of the cargo bed.

BRIEF DESCRIPTION OF THE DRAWINGS

The invention will now be described in greater detail in the following way of example only and with reference to the attached drawings, in which.

DETAILED DESCRIPTION OF THE INVENTION

A new air spoiler was developed with the goal of ease of manufacturing, installation and removal than air spoilers currently available. In one embodiment, an inflatable air spoiler 10 has an flexible balloon or collapsible closed chamber 25 with a wedge shaped exterior. (See FIGS. 1 through 3). In another embodiment (not shown), an inflatable air spoiler 10 has a flexible balloon or collapsible closed chamber 25 that inclines and supports a front panel 17 to direct air flow away from a vehicle.

Figure 1:
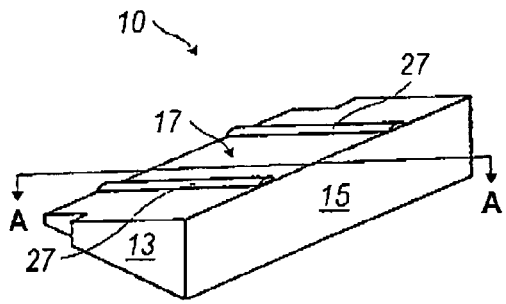
FIG. 1 is a perspective view of one embodiment of an inflatable air spoiler.
Figure 2:
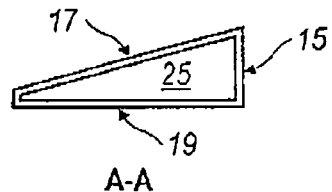
FIG. 2 is a cross sectional view of one embodiment of an inflatable air spoiler.
Figure 3:
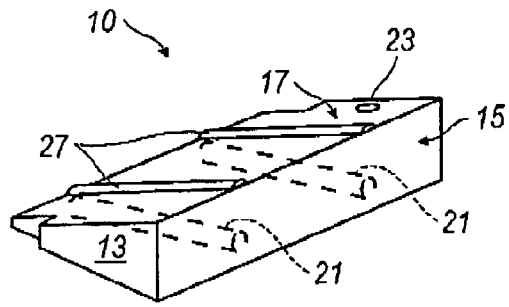
FIG. 3 is a perspective view of another embodiment of an inflatable air spoiler.

More specifically, the inflatable air spoiler 10 is a flexible balloon with a wedge shaped exterior removably fixed to a vehicle to direct air flow away from the vehicle. In one embodiment, an inflatable air spoiler 10 is constructed from a number of panels to form a collapsible closed chamber 25 with a wedge shaped exterior. As depicted in FIGS. 1 through 3, an air spoiler 10 includes a back panel 15, at least two parallel side panels 13, a bottom panel 19 disposed between and perpendicular to the side panels 13, and a front panel 17 disposed between the side panels 13 and inclined (or sloped away) from the bottom panel 19. These panels are connected to each other to form the closed chamber 25 with a wedge shaped exterior. (See FIGS. 1 through 3).

Such an embodiment of an inflatable spoiler 10 can be manufactured from a flexible sheet material capable of containing a pressurized fluid when shaped into a collapsible closed chamber 25. Such a flexible sheet material could be rubber, neoprene rubber, HYPALON, or plastic sheeting. The thickness of the flexible sheet material and/or the exterior surface must be capable to withstand rough service and abrasions from contact with a vehicle. Furthermore, such flexible sheet material must be capable of withstanding and containing the pressure of a fluid (such as air) introduced into the closed chamber 25.

In another embodiment (not shown), the wedge shaped exterior of an inflatable air spoiler 10 is achieved by connecting at least a portion of a front panel 17 to a collapsible closed chamber 25. Collapsible closed chamber 25 is fluidly connected to a re-sealable port 23 to allow inflation or deflation of the collapsible closed chamber 25. When inflated, collapsible closed chamber 25 supports front panel 17 in an inclined position to direct air flow up and away from a vehicle. It is contemplated that such a collapsible closed chamber 25 can have a spherical, columnar, or even wedge shaped exterior. As described above, collapsible closed chamber 25 can be constructed from panels of flexible sheet material. Front panel 17 can be constructed from the same flexible sheet material or a rigid material such as fiberglass, wood or metal. When front panel 17 is constructed from a flexible material, then more of the exterior surface of collapsible closed chamber 25 must be in contact with front panel 17. For example, if vinyl sheet material is used for both front panel 17 and collapsible closed chamber 25, then support of front panel 17 is achieved by connecting or at least contacting all of front panel 17 with the exterior of collapsible closed chamber 25. In contrast, if front panel 17 is constructed from plywood, then support from collapsible closed chamber 25 is achieved through a smaller connection or contact with the exterior of collapsible closed chamber 25. It is contemplated that rigid (or flexible) side panels 13, back panels 15, and/or bottom panel 19 connected to collapsible closed chamber 25 can further define the wedge shape of inflatable air spoiler 10.

It is further contemplated, although not shown, that collapsible closed chamber 25 can be compartmentalized to reduced the likelihood of losing the wedge shape of an inflatable air spoiler 10. Furthermore, an inflatable support 27 can be added or incorporated into an inflatable air spoiler 10 to act as a stiffener thereby increasing its rigidity. This is particularly useful when an inflatable air spoiler 10 is constructed from mostly flexible materials. As shown in FIGS. 1 and 3, inflatable supports 27 are added to a front panel 17 to eliminate or at least prevent deformation of the inflatable air spoiler's 10 wedge shape. Such inflatable supports 27 can also be located at the peripheral regions of an inflatable air spoiler 10 to maintain the wedge shape.

Figure 4:
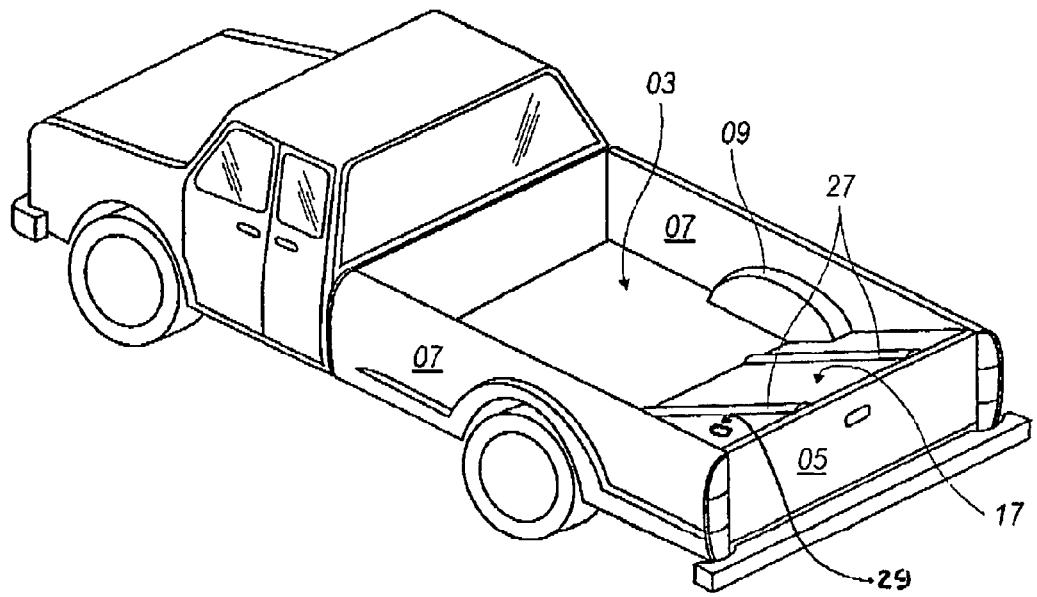
FIG. 4 is a perspective view of yet another embodiment of an inflatable air spoiler installed in a truck cargo bed.

It is further contemplated, that a sealable ballast compartment or chamber 21 can be added to the inflatable spoiler 10 to receive heavy material, such as water or sand. (See FIG. 3) Such a ballast chamber 21 can be used to keep an inflatable spoiler 10 in place. And when used in a truck cargo bed, the added weight can be beneficial in preventing the loss of rear wheel traction. In a preferred embodiment, a ballast compartment 21 is located on bottom panel 19. (See FIG. 3). In other embodiments, not shown, ballast chamber 21 is positioned at the lower end of front panel 17 and/or side panels 13. Regardless of where a ballast chamber 21 is positioned on an inflatable air spoiler 10, it is in contact with horizontal vehicle surface 03. (See FIG. 4).

Inflating a spoiler 10 requires a re-sealable inlet port 23 (FIG. 3) fluidly connected between a fluid source and flexible balloon or collapsible closed chamber 25. In a preferred embodiment, re-sealable inlet port 23 is positioned on the surface of one of the side panels 13, back panel 15, and/or front wall 17 to allow a fluid, such as air, to pass into or out of collapsible closed chamber 25. It is further contemplated that a pressure relief valve 29 can be fluidly connected to a flexible balloon or collapsible closed chamber 25 to prevent over pressurization or deformation of the inflatable spoiler's 10 wedge shape.

Securement of an inflatable air spoiler 10 to a vehicle can be achieved in a variety of conventional means such as hooks, snaps, buttons, zippers and/or other releaseable securing devices. Furthermore, a ballast chamber 21, when filled, can provide the necessary means to secure a inflatable air spoiler 10 to a vehicle. In situations where an inflatable air spoiler 10 is placed in a vehicle's cargo bed, securement can be achieved through pressure from balloon or collapsible closed chamber 25 pressing side panels 13 and/or its exterior surface against the vehicle's side walls 07.

It is contemplated that inflatable air spoiler 10 have a sufficient wedge shape or inclined front panel 17 to direct air away from vehicle. When used in a vehicle's cargo bed, a preferred inflatable air spoiler 10 will have a back panel 15 which is as tall as the vehicle's tailgate 05 to that air flow is directed away from the tail gate 05. When used in a vehicle's cargo bed that has wheel wells 09, inflatable air spoiler 10 can be constructed to either cover, partially cover or not cover the wheel wells 09.

An inflatable air spoiler 10 and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

I claim:

1. An inflatable air spoiler of a vehicle comprising:
   a re-sealable port fluidly connected to a flexible balloon with a wedge shaped exterior, said balloon removeably fixed to the vehicle to direct air flow away from the vehicle.

2. An inflatable air spoiler of a vehicle comprising:
   a re-sealable port fluidly connected to a flexible balloon with a wedge shaped exterior, said balloon removeably fixed to the vehicle to direct air flow away from the vehicle; and
   an inflatable support fixed to said flexible balloon to enhance rigidity of the air spoiler.

3. An inflatable air spoiler of a vehicle comprising:
   a re-sealable port fluidly connected to a flexible-balloon with a wedge shaped exterior, said balloon removeable fixed to the vehicle to direct air flow away from the vehicle; and
   a sealable ballast chamber fixed to a lower portion of said flexible balloon to enhance securement of the air spoiler to the vehicle.

4. An air spoiler for a vehicle comprising:
   a collapsible closed chamber with an exterior surface;
   a re-sealable port fluidly connected to said collapsible closed chamber; and
   a front panel connected at least in part to said collapsible closed chamber, wherein pressurization of said collapsible closed chamber with a sufficient volume of fluid supports said front panel in an inclined position from a horizontal plane thereby directing air flow away from the vehicle.

5. An air spoiler as claimed in claim 4, further comprising a side panel connected at least in part to said collapsible closed chamber, wherein said pressurization of said collapsible closed chamber supports said side panel in a substantially vertical position.

6. An air spoiler as claimed in claim 5, wherein said front panel and said side panel are rigid.

7. An air spoiler as claimed in claim 4, further comprising an inflatable support fixed to and spanning a portion of said front panel; wherein said inflatable support is filled with a sufficient second volume of fluid to become sufficiently rigid to at least reduce bowing of said front panel.

8. An air spoiler for a vehicle comprising:
   at least two side panels parallel to each other;
   a bottom panel disposed between and perpendicular to said side panels; and
   a front panel disposed between said side panel and inclined to said bottom panel, wherein said side panels, said bottom panel and said front panel are peripherally connected to each to form a closed chamber with a wedge shape exterior removeably fixed to the vehicle, and said closed chamber fluidly connected to a re-sealable port.

9. An air spoiler for a vehicle comprising:
   at least two side panels parallel to each other;
   a bottom panel disposed between and perpendicular to said side panels;
   a front panel disposed between said side panel and inclined to said bottom panel, wherein said side panels, said bottom panel and said front panel are peripherally connected to each to form a closed chamber with a wedge shape exterior removeably fixed to the vehicle, and said closed chamber fluidly connected to a re-sealable port; and
   a sealable ballast compartment is fixed to a portion of said bottom panel to, when filled, enhances fixation of the air spoiler to the vehicle.

10. An air spoiler for a vehicle comprising:
    at least two side panels parallel to each other;
    a bottom panel disposed between and perpendicular to said side panels;
    a front panel disposed between said side panel and inclined to said bottom panel, wherein said side panels, said bottom panel and said front panel are peripherally connected to each to form a closed chamber with a wedge shape exterior removeably fixed to the vehicle, and said closed chamber fluidly connected to a re-sealable port; and
    an inflatable support formed in and spanning across a portion of said front panel to, when filled, enhance rigidity of said front panel.

11. An air spoiler as claimed in claim 8, wherein a relief valve is fluidly connected to said closed chamber.

* * * * *